W. B. DAVIDSON.
GAS AND LIQUID CONTACT APPARATUS.
APPLICATION FILED MAR. 15, 1918.
Patented July 1, 1919.
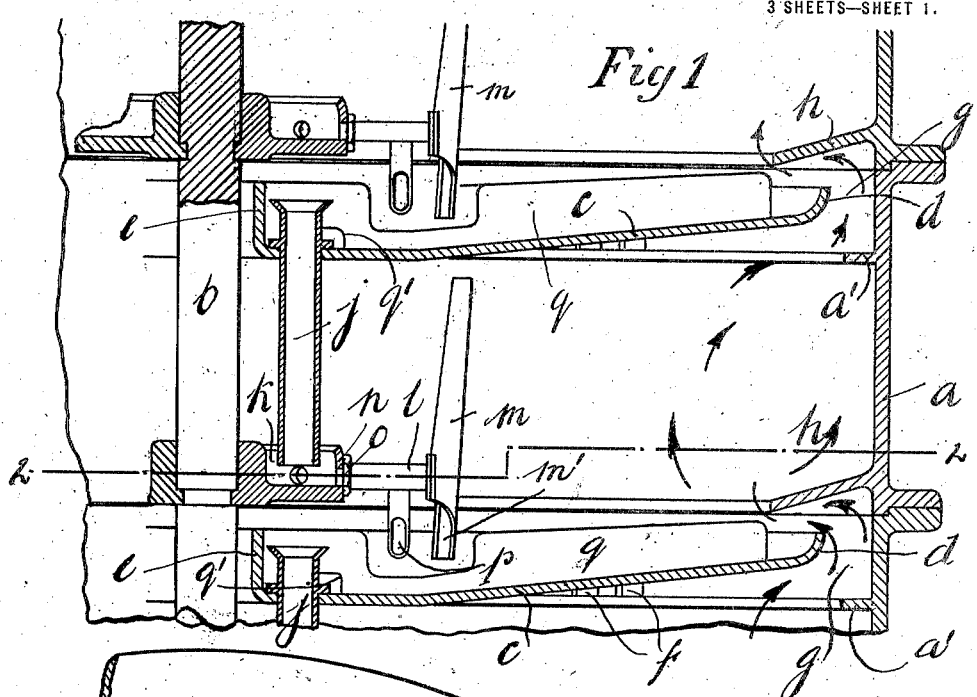
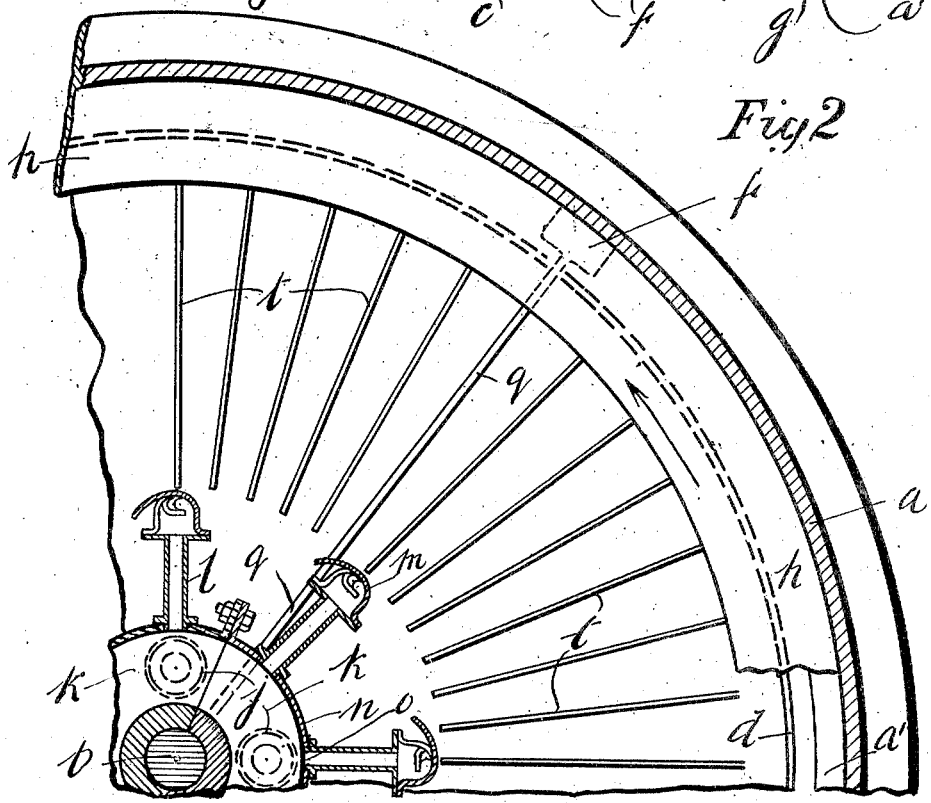
Inventor:-
William Brown Davidson,
By:- B. Singer, atty.

W. B. DAVIDSON.
GAS AND LIQUID CONTACT APPARATUS.
APPLICATION FILED MAR. 15, 1918.
1,308,338.
Patented July 1, 1919.
3 SHEETS—SHEET 3.
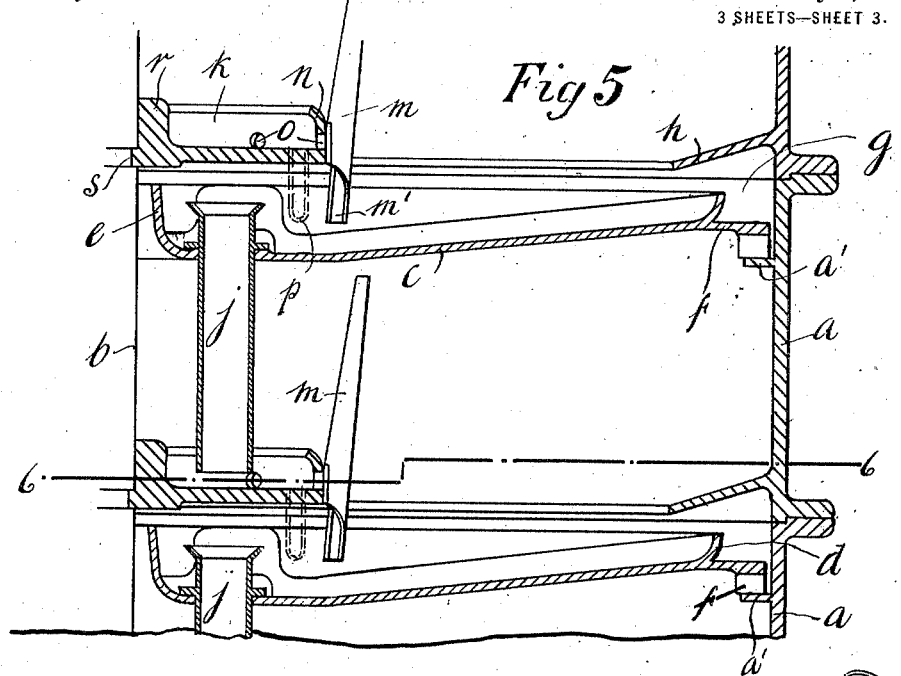
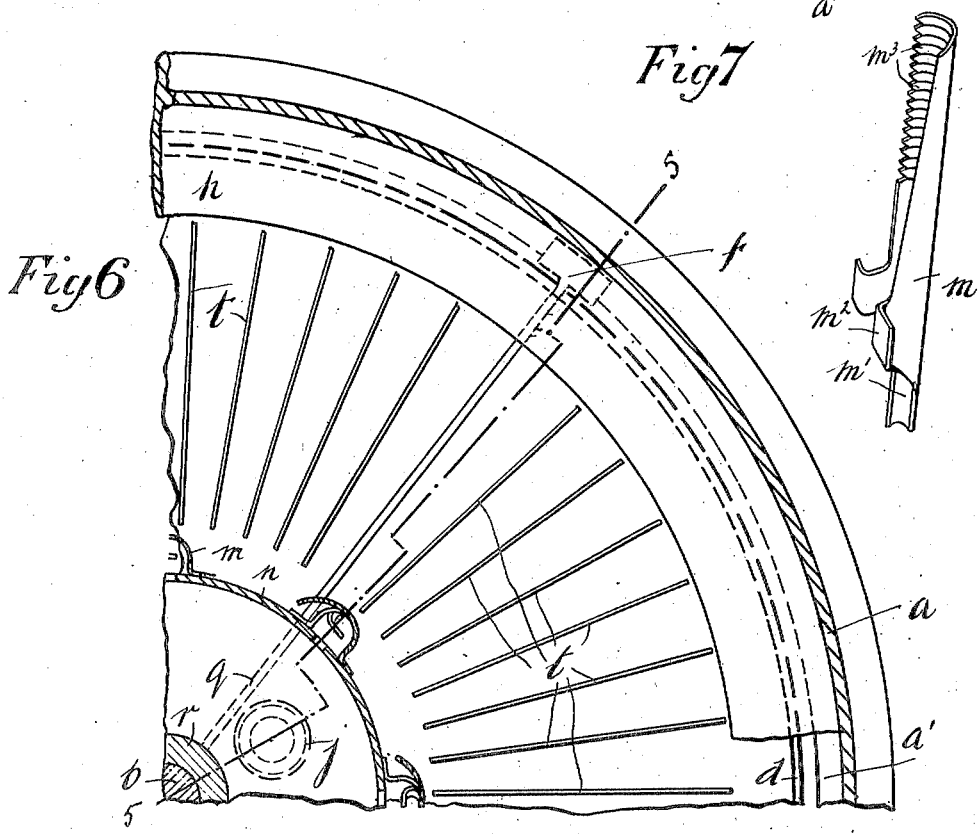
Inventor:
William Brown Davidson,
By I. B. Singer, Atty.

UNITED STATES PATENT OFFICE.

WILLIAM BROWN DAVIDSON, OF HUDDERSFIELD, ENGLAND.

GAS AND LIQUID CONTACT APPARATUS.

1,308,338.         Specification of Letters Patent.       Patented July 1, 1919.

Application filed March 15, 1918. Serial No. 222,722.

*To all whom it may concern:*

Be it known that I, WILLIAM BROWN DAVIDSON, D. Sc., Ph. D., F. I. C., subject of the King of Great Britain, and residing at 4 Kaffir road, Huddersfield, in the county of Yorkshire, England, chemical engineer, have invented certain new and useful Improvements in Gas and Liquid Contact Apparatus, of which the following is a specification.

The invention comprises improvements in apparatus for bringing liquids and gases, vapors, fumes, or the like into intimate contact for such purposes as washing out impurities, rectification, effecting solutions and the like.

The invention refers to an apparatus of the type in which a succession of superposed chambers are each provided with rotating liquid spraying means and passages are provided from chamber to chamber up the apparatus for the gas or the like and overflows from chamber to chamber down the apparatus for the liquid, and the gas or the like has to pass through the sprayed liquid in each chamber.

One feature of the invention is the construction and arrangement of the liquid overflows. Another feature is the construction of the spraying means; while the relative arrangement of the liquid overflows and the spraying means is a further feature. Other features will be more particularly pointed out in the claims.

On the drawings:—

Figure 1 is a sectional view of one half of a chamber of the apparatus with another chamber superposed thereon.

Fig. 2 is a section on line 2—2 of Fig. 1.

Fig. 5 is a similar view to Fig. 1 but showing a further modification, the section being taken on line 5—5 of Fig. 6.

Fig. 6 is a section on line 6—6 of Fig. 5.

Fig. 7 is a detail of a spraying vane.

Figure 3:
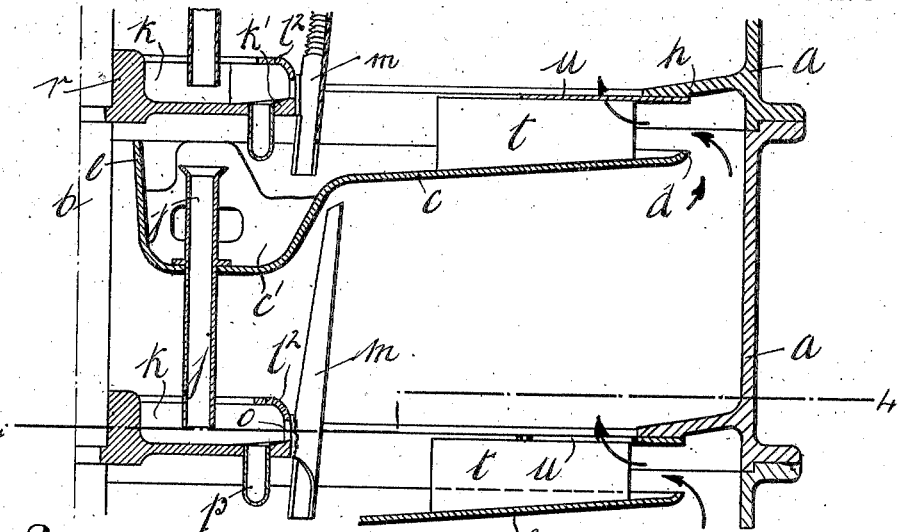
Fig. 3 is a similar view to Fig. 1 but showing a modification of the spraying means.

The improved apparatus as is common with apparatus for bringing liquids or gases or vapors, fumes or the like into contact, such as gas washing apparatus, comprises a series of superposed chambers. In common with existing apparatus a cylindrical or other container $a$ is built up in sections and provided with a base plate for each chamber and with a central driving shaft $b$ common to all chambers for actuating the rotating spraying means which are disposed in the respective chambers.

The preferred form of base plate is a dished plate $c$ with an upturned peripheral edge $d$ and a central funnel $e$ to pass the shaft $b$. The base plate may be supported in any suitable manner to the container wall $a$, such as by means of a ledge $a^1$ on the wall $a$ and a series of projecting lugs $f$ on the base plate supported by vertical ribs or the like to the ledge $a^1$. The gas passage $g$ is preferably arranged around the edge of the base plate in each chamber and is crossed at intervals by the lugs $f$ projecting from the plate.

On the container wall $a$ of each chamber overhanging the gas passage $g$ around the edge of the base plate $c$ is an overhanging ledge $h$ to prevent sprayed liquid passing down the gas passage and to deflect the gas away from the wall of the chamber toward the spraying means.

Each base plate is perforated near the central funnel $e$ and one or more overflows $j$ are formed or secured in the perforations. As illustrated the overflows $j$ are vertical pipes and project above the base plate to the desired level for the liquid in the chamber and depend below the base plate into proximity with the spraying device of the adjacent lower chamber.

The spraying device comprises a dish $k$, mounted to rotate with the shaft $b$, and carrying a series of tubular arms $l$ to which spraying vanes $m$ hereinafter described are secured. The dish $k$ has perforations $o$ through its upstanding peripheral wall $n$ and the perforations $o$ communicate with the tubular arms $l$. The extremities of the overflows $j$ from one chamber are above, or enter into, the dish $k$ of the sprayer in the adjacent lower chamber, so that liquid overflowing from an upper chamber is at once distributed to the spraying device of the next chamber.

One form of spraying vane is illustrated at Fig. 7 and comprises a half round or like scoop portion $m^1$ an attachment portion $m^2$ where it is attached by outwardly bent flanges, or any other means to a collar or the like on an arm $l$ and an upper serrated edged part $m^3$, one edge is preferably plain.

The scoop $m^1$ dips in the liquid in the base plate $c$ and raises it as the spraying device is rotated with the shaft $b$, and the liquid passes up the vane and is sprayed off its edge under centrifugal action and the small drops are flung across the chamber and a very efficient liquid spray is provided through which the gas or the like from the gas passage $g$ must pass in its way to the next chamber. The flow of the gas is indicated by arrows at Fig. 1.

I may provide each tubular sprayer arm $l$ with a supplementary scoop as at $p$ if desired, or I may stagger the vanes by arranging the arms $l$ of different lengths with the object of preventing cavitation of the liquid in the dished base plate as the scoops rotate in it.

On the base plate $c$ fixed radial or other ribs or plates $q$ are provided to act as breakwaters and prevent the spinning around of the liquid by the rotating scoops, but apertures as at $q^1$ prevent any differences of level being created.

Figure 4:
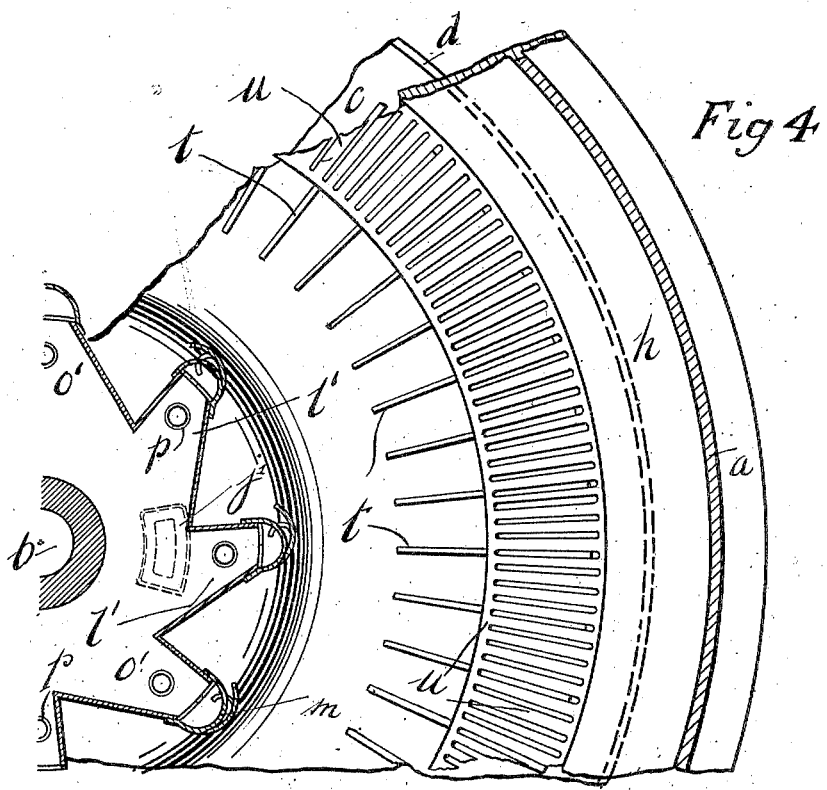
Fig. 4 is a section on line 4—4 of Fig. 3.

In the arrangement shown at Figs. 3 and 4 the spraying device is modified by forming the arms carrying the sprayers as tapering extensions $l^1$ from the dished part $k$. The bottom of the dished plate toward these extensions $l^1$ is preferably inclined as at $k^1$ Fig. 3 and an overhang or hood over the extensions or part thereof is preferably curved as at $l^2$. It will be seen from the plan that the extensions $l^1$ instead of being radial to the sprayer axis are set substantially tangential thereto so that the entrance mouth or aperture $o^1$ leading from the dished part $k$ to the spraying vane $m$ at the extremity of the extension, is in advance of the vane during rotation in the direction indicated by the arrow, and the converging sides of the extensions $l^1$ facilitate or direct the flow of liquid from the dish to the spraying vanes.

In this construction I have shown the dished base plate $c$ with a pronounced well part $c^1$ where the scoops of the spraying devices rotate and the overflows $j$ are carried through this well part. The overflows instead of circular section may follow the shape indicated by the plan in dotted lines at $j^1$.

In the arrangement illustrated at Figs. 5 and 6 the spraying device is modified by omitting the arms $l$ and enlarging the dished part $k$ and mounting the spraying vanes $m$ directly on the wall of the dish. The apertures $o$ in the wall $n$ of the dish in this case lead directly into the spraying vanes $m$. In this case also if desired, the additional scoops $p$ may be employed but would lead through the bottom of the dish $k$ as shown in dotted lines in the upper chamber at Fig. 5.

While any suitable method of mounting the spraying means on the shaft $b$ may be followed, I have illustrated an arrangement in which the spraying device is divided and has at the central boss $r$ an inwardly projecting rib $s$ to fit grooves in the shaft and the two parts of the spraying device are bolted together on the shaft, see for example Fig. 2. The spraying devices are suitably keyed on the shaft so that all rotate with the shaft. Any means for driving the shaft may be employed.

As shown I may arrange upstanding ribs or plates $t$ on the base plates $c$ between the breakwaters $q$ so that as the gas passes through the side passage $g$ and inwardly toward the shaft to pass the overhanging ledge $h$ the gas comes into contact with the liquid drops on the ribs or plates $t$ and a scrubbing action is effected. As shown at Figs. 3 and 4 I may employ a grid extension $u$ from the ledge $h$ over the upper edges of the ribs or plates $t$ the grid having numbers of slots or perforations, as clearly shown at Fig. 4.

I claim:—

1. In apparatus for bringing liquids into intimate contact with gases, vapors, fumes, and the like, the combination of a casing formed by a plurality of superposed chambers, a base to each chamber, rotating means in said chambers, spraying devices on said rotating means in said chambers, a passage at the outer edge of said base in each chamber, and liquid overflows passing through said base in each chamber, said overflows projecting above the bottom of said base and depending below said base well within the circular path described by the spraying means.

2. In apparatus for the purpose set forth, the combination of a casing comprised of superposed chambers, with a base to each chamber and rotating means in said chambers with spraying means thereon, a passage between the outer edge of said base and the casing in each chamber, and liquid overflows passing through said base in each chamber; said spraying means having a collecting portion and said overflows projecting above the bottom of said base and depending below same to deliver overflow liquid into said collecting portion of said spraying means.

3. In apparatus for the purpose set forth, the combination of a casing comprised of superposed chambers, with a base to each chamber, a rotating shaft in said chambers with spraying means thereon, a passage between the outer edge of said base and the casing in each chamber, and liquid overflows through said base in each chamber; said spraying means having a collecting portion, said collecting portion being disposed between the sprayers and the shaft and said overflows projecting above the bottom of said base and depending below same to deliver overflow liquid into said collecting portion and said collecting portion having communication with said spraying means.

4. In apparatus for the purpose set forth the combination of a casing comprised of a plurality of superposed chambers a base to each chamber, rotating means in said chambers, spraying devices on said rotating means in said chambers, a passage between the outer edge of said base and said casing in each chamber, and liquid overflows through said base in each chamber, said spraying devices comprising separated vanes with scoop-like parts projecting toward said base and said overflows projecting above the bottom of said base and depending below said base well within the circular path described by said spraying vanes, where collecting means communicating with the spraying vanes is disposed.

5. In apparatus for the purpose set forth, the combination of a casing composed of superposed chambers with a base to each chamber said base being dished and having a central funnel portion, a rotating shaft in said chambers, said shaft passing through the funnel portions of said bases, spraying means on said shaft in each chamber, said spraying means comprising a dish like collecting part adjacent to the shaft and upstanding hollow vanes having downwardly projecting liquid scoops, said collecting part having communication with said vanes, a passage between the outer edge of each base and casing, said passage being adjacent to the wall of the chamber, and overflows disposed in each base, said overflows having portions projecting above the bottom of said base and having downwardly depending portions below said base, said depending portions communicating with the collecting part of said spraying means.

6. In apparatus for the purpose set forth, the combination of a casing composed of superposed chambers, with a base to each chamber, said base being dished and having a central funnel portion, a rotary shaft in said chambers, said shaft passing through the funnel portions of said base, spraying means on said shaft in each chamber, said spraying means comprising a dish like collecting part adjacent to the shaft and upstanding hollow vanes having downwardly projecting liquid scoops, said collecting part having communication with said vanes, addition-liquid raising scoops associated with said spraying means, a passage between the outer edge of each base and casing, said passage being adjacent to the wall of the chamber, a guarding and deflecting ledge overhanging said passage, and overflows disposed in each base, said overflows having portions projecting above the bottom of said base and having downwardly depending portions below said base, said depending portions communicating with the collecting part of said spraying means.

7. In apparatus for the purpose set forth, the combination of a casing composed of superposed chambers, with a base to each chamber, said base being dished and having a central funnel portion, a rotary shaft in said chambers said shaft passing through the funnel portions of said bases, spraying means on said shaft in each chamber, said spraying means comprising a boss for mounting on said shaft, a collecting dish portion surrounding said boss, hollow extensions projecting from said collecting dish and spraying vanes mounted on said hollow extensions and said extensions leading from said dish to said spraying vanes; a passage between the outer edge of each base and casing said passage being adjacent to the wall of the chamber, and overflows disposed in each base, said overflows having portions projecting above the bottom of said base and having downwardly depending portions below said base, said depending portions communicating with the collecting part of said spraying means.

8. In apparatus for the purpose set forth, the combination of a casing composed of superposed chambers with a base to each chamber, said base being dished and having a central funnel portion, a rotary shaft in said chambers, said shaft passing through the funnel portions of said bases, spraying means on said shaft in each chamber, said spraying means comprising a boss for mounting on said shaft, a collecting dish portion surrounding said boss, hollow extensions projecting from and in communication with said collecting dish and spraying vanes mounted on said hollow extensions, said spraying vanes having an upstanding spraying portion and a downwardly projecting liquid scoop portion, additional liquid scoops associated with said extensions, and said extensions communicating with the interior of said spraying vanes; a passage between each base and casing said passage being adjacent to the wall of the chamber, and overflows disposed in each base, said overflows having portions projecting above the bottom of said base and having downwardly depending portions below said base, said depending portions communicating with the collecting part of said spraying means.

9. In apparatus for the purpose set forth the combination of a casing composed of a plurality of superposed chambers each having a surrounding container wall and a base, said base having a dished form with a raised peripheral edge, lugs projecting from said base beyond said edge, a ledge on said container wall, and means for supporting said base on said ledge, by means of said lugs, spaces below said lugs to form a passage for gases, vapors, and fumes around said raised peripheral edge of said base, an overhanging ledge on said container wall protecting said passage in each chamber; rotary means in said chambers and spraying devices on said rotary means in each chamber and liquid overflows in said base from one chamber to the next lower chamber.

10. In apparatus for the purpose set forth the combination of a casing composed of a plurality of superposed chambers each having a surrounding container wall and a base, said base having a dished form with a raised peripheral edge, lugs projecting from said base beyond said edge, a ledge on said container wall and means for supporting said base on said ledge, a passage for gases, vapors, and fumes around said raised peripheral edge of said base, an overhanging ledge on said container wall protecting said passage in each chamber; rotary means in said chambers and spraying devices on said rotary means in each chamber and liquid overflows in said base from one chamber to the next lower chamber, and upstanding means on each base to prevent the liquid in said chambers being carried around with the rotary spraying devices, and apertures in said means to prevent inequalities of liquid level occurring.

11. In apparatus for the purpose set forth the combination of a casing composed of a plurality of superposed chambers each having a surrounding container wall and a base, said base having a dished form with a raised peripheral edge, lugs projecting from said base beyond that edge, a ledge on said container wall and means for supporting said base on said ledge, a passage for gases, vapors, and fumes around said raised peripheral edge of said base, an overhanging ledge on said container wall protecting said passage in each chamber; rotary means in said chambers and spraying devices on said rotary means in each chamber; said spraying devices each comprising a boss by which same is mounted, a surrounding collecting dish, hollow extensions from said dish and spraying vanes at the extremities of said extensions, liquid overflows in said base from one chamber to the next lower chamber, said overflows having a portion projecting above the bottom of said base and a portion depending below said base into the collecting dish of said spraying means in said next lower chamber.

12. In apparatus for the purpose set forth, the combination of a casing composed of superposed chambers with a base to each chamber and rotating means in said chambers with spraying means thereon, a passage between the outer edge of said base and said casing in each chamber, and liquid overflows through said base in each chamber; said spraying means comprising a collecting portion and extensions from said portion carrying spraying vanes said extensions having converging sides, and said overflows projecting above the bottom of said base and depending below the same to deliver overflow liquid into said collecting portion of said spraying vanes.

In testimony whereof I affix my signature.

WILLIAM BROWN DAVIDSON.